C. W. DAKE.
ADJUSTABLE HUB PLATE.
APPLICATION FILED JULY 21, 1919.
1,397,083.
Patented Nov. 15, 1921.
2 SHEETS—SHEET 1.
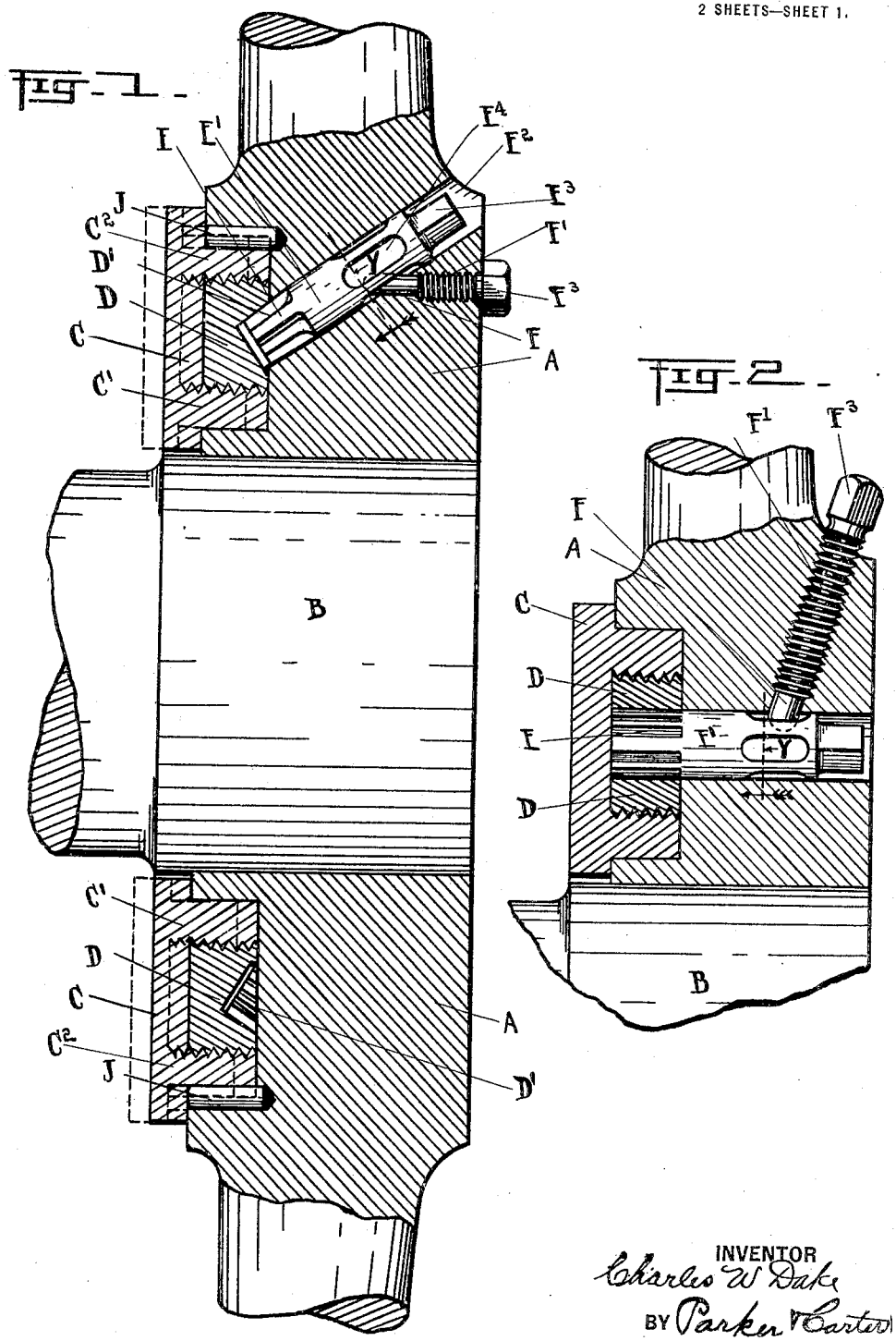
INVENTOR
Charles W Dake
BY Parker & Carter
ATTORNEYS

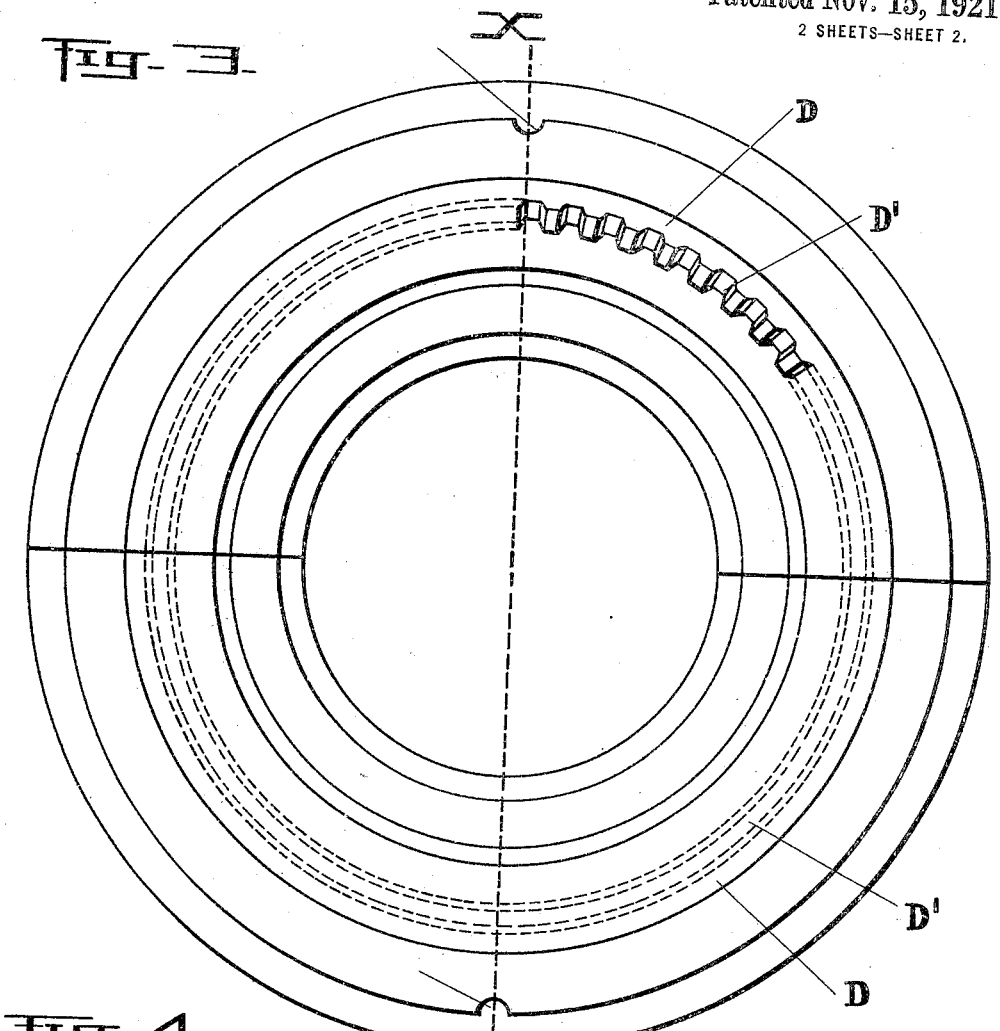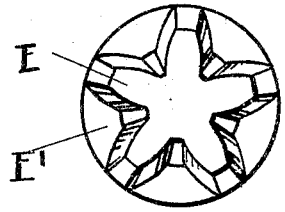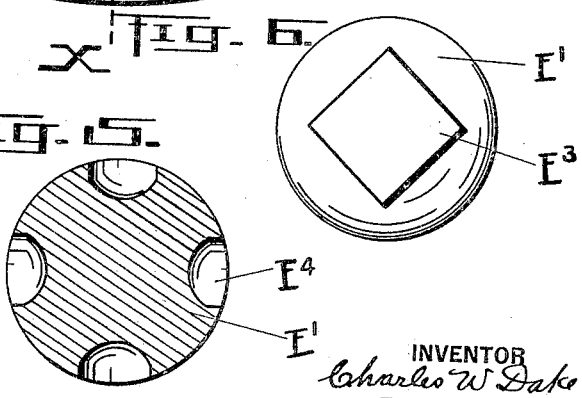

UNITED STATES PATENT OFFICE.

CHARLES W. DAKE, OF CHICAGO, ILLINOIS, ASSIGNOR TO SMITH LOCOMOTIVE ADJUSTABLE HUB COMPANY, OF CHICAGO, ILLINOIS, A CORPORATION OF ARIZONA.

ADJUSTABLE HUB-PLATE.

1,397,083.      Specification of Letters Patent.      Patented Nov. 15, 1921.

Application filed July 21, 1919. Serial No. 312,263.

*To all whom it may concern:*

Be it known that I, CHARLES W. DAKE, a citizen of the United States, residing at Chicago, in the county of Cook and State of Illinois, have invented a certain new and useful Improvement in Adjustable Hub-Plates, of which the following is a specification.

My invention relates to means for advancing the wearing plate which is used in connection with a wheel hub, particularly a locomotive wheel hub. It has for its object to provide mechanical means whereby such wearing plate may be so advanced as to take up for wear. It is illustrated in the accompanying drawings wherein—

Figure 1 is a cross section on the line $x$—$x$ of Fig. 3; with my improvements applied;

Fig. 2 is a cross section of a modification;

Fig. 3 is an elevation of the device shown in Fig. 1, with parts cut away. Figs. 4, 5 and 6 are details.

Like parts are indicated by the same letter in all the figures.

A is the hub, B the axle on which the hub is mounted.

C is a wearing plate provided with inwardly projecting internally screw threaded flanges $C^1$ and $C^2$.

D is a ring internally and externally screw threaded to be received into the screw threads on the flange and provided with an internal gear or rack $D^1$, adapted to receive the pinion like end E of the pin $E^1$ which lies in the hole $E^2$ in the hub and is provided with the end $E^3$ whereby it can be rotated and a series of surface recesses $E^4$ which are adapted to be engaged by the end F on the lock screw $F^1$, which is screw threaded into a hole in the hub which hole is inclined to the hole which contains the pin $E^1$. This pin has a head $F^3$ whereby it may be rotated and its end F is adapted to be received into the recesses on the surface of the pin $E^1$ to lock it in position. In the modification shown in Fig. 2, two rings are substituted for the ring D and in this case, the pin $E^1$ is parallel with the axis of the shaft and carries the pinion $E^2$ to engage interior racks on the rings. The modification of Fig. 2 is shown merely for illustrative purposes.

JJ are dowel-pins leading into the hub and the plate, whereby the latter is prevented from rotation. They are not necessary in the form of Fig. 2 where the two rings rotate in opposite directions to advance the plate.

The use and operation of my invention are as follows:—

Having particular reference to the device illustrated in Figs. 1, 3, 4 and 5, the rotation of the pin $E^1$ which may be effected by means of a socket wrench when the lock screw $F^1$ is retraced, will rotate the ring D and since that ring is screw threaded into the flanges on the plate C, the latter will be advanced. It will be held from rotation by means of the dowel-pins. I have shown in Fig. 1, a particular arrangement of the parts and included a locking screw $F^1$ which is advanced to engage one of the recesses on the face of the driving pin when the latter has been brought to a proper position to sufficiently advance the wearing plate to accommodate for the wear. In the device shown in Fig. 2, I substitute for the single ring, two rings which rotate in opposite directions and therefore no lock for the wearing plate to prevent it from rotating is necessary. In the structure of Fig. 1, it would be possible to rotate the plate and hold the ring by means of dowel-pins and so in the device of Fig. 2, it would be possible to rotate the plate and hold the rings from rotation.

I have spoken of the hub as having an annular recess but it may easily be understood that the same effect would be obtained by having a flange, plate or ring properly disposed and it will also be understood that the recess could be in the plate and the other projecting parts on the hub. It will also be understood that the recess, as to some features of the invention, might be dispensed with entirely and in such case, the word "recess" as I use it in the claims, should be understood to refer only to the contacting parts or opposed parts of the plate and hub, although the recess, whether placed on the plate or away, is so minute as to be negligible or entirely dispensable.

I have spoken of this device as an adjustable hub plate but, of course, it is perfectly obvious that the word "hub" may here be taken in a broad sense to include any or all parts against which the plate bears and while I have contemplated the application of my invention to the hub of locomotive wheels, it might be used with any other device where such an adjustable plate is desired. The word "hub" therefore, is to be understood as anything which in effect would be the bearing part against which the plate abuts.

I claim:

1. The combination of a hub, having an annular recess on one side with a plate having two internally threaded flanges to be received into the recess, a ring like means externally threaded to engage the threads on the flange, and a pinion to engage the threads on the flange and a pinion to engage and rotate the ring like means to advance the plate, and means for locking the pinion in position, said means comprising locking pins transverse to the driving pinion and adapted to be received into the external recesses on the driving pinion.

2. The combination of a hub, having an annular recess on one side with a plate having two internally threaded flanges to be received into the recess, a ring like means externally threaded to engage and rotate the ring like means to advance the plate, and means for locking the plate from rotation, and means for locking the pinion in position, said means comprising locking pins transverse to the driving pinion and adapted to be received into the external recesses on the driving pinion.

3. A hub having an annular recess on one side, in combination with a plate having two inwardly screw threaded flanges, adapted to be received into the recess, ring like means externally threaded to engage the threads on the flange, a gear on the rear face of the ring and a driving pin provided with a pinion adapted to engage said gear.

4. A hub having an annular recess on one side, in combination with a plate having two inwardly screw threaded flanges, adapted to be received into the recess, means for preventing the plate from rotating, a driving pin provided with a pinion which engages a gear on the back of the ring, the pin on which the pinion is mounted, provided with surface recesses and an inclined locking pin adapted to engage said recesses.

5. A hub having an annular recess on one side, in combination with a plate having inwardly screwthreaded flanges, adapted to be received into the recess, a ringlike member externally threaded to engage the threads on the flanges, a rack formed in the rear of the ring, and a beveled pinion adapted to engage said rack and rotate the ringlike member to advance the plate.

6. A hub having an annular recess on one side, in combination with a plate having inwardly screwthreaded flanges, adapted to be received into the recess, a ring externally threaded to engage the threads on the flange, an inclined rack formed in the back of said ring, and a beveled pinion adapted to engage said rack and rotate said ring to advance the plate.

7. A hub having an annular recess on one side, in combination with a plate having inwardly screwthreaded flanges, adapted to be received into the recess, a ring externally threaded to engage the threads on the flange, an inclined rack formed in the back of said ring, and a beveled pinion adapted to engage said rack and rotate said ring to advance the plate, and locking means comprising a transversal pin and means for advancing it to contact said pinion.

8. A hub having an annular recess on one side, in combination with a plate having inwardly screwthreaded flanges, adapted to be received into the recess, a ring externally threaded to engage the threads on the flange, an inclined rack formed in the back of said ring, and a beveled pinion adapted to engage said rack and rotate said ring to advance the plate, and locking means comprising a transversal locking pin, inclined to the axis of the pinion, and adapted to be advanced there against and to penetrate an aperture therein.

In testimony whereof, I affix my signature in the presence of two witnesses this 16th day of July, 1919.

CHARLES W. DAKE.

Witnesses:
 EDITH L. PORTER,
 MILDRED H. MACKE.